United States Patent
Sahin et al.

(10) Patent No.: US 10,725,175 B2
(45) Date of Patent: Jul. 28, 2020

(54) METHOD, APPARATUS AND SYSTEM FOR RECEIVING WAVEFORM-DIVERSE SIGNALS

(71) Applicant: Government of the United States, as represented by the Secretary of the Air Force, Wright-Patterson AFB, OH (US)

(72) Inventors: Cenk Sahin, Beavercreek, OH (US); Justin G. Metcalf, Dayton, OH (US); Braham Himed, Beavercreek, OH (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 52 days.

(21) Appl. No.: 16/175,199

(22) Filed: Oct. 30, 2018

(65) Prior Publication Data

US 2020/0132836 A1   Apr. 30, 2020

(51) Int. Cl.
*G01S 15/00* (2020.01)
*G01S 15/89* (2006.01)
(Continued)

(52) U.S. Cl.
CPC .......... *G01S 15/8979* (2013.01); *G01S 7/282* (2013.01); *G01S 7/52025* (2013.01); *G01S 13/878* (2013.01)

(58) Field of Classification Search
CPC .... G01S 15/8979; G01S 7/282; G01S 13/878; G01S 7/52025; G01S 13/584;
(Continued)

(56) References Cited

U.S. PATENT DOCUMENTS

| 4,158,888 A | 6/1979 | Shapiro |
| 4,734,699 A | 3/1988 | Kretschmer |

(Continued)

OTHER PUBLICATIONS

T. Higgins, K. Gerlach, A. K. Shackelford and S. D. Blunt, "Aspects of Non-Identical Multiple Pulse Compression," 2011 IEEE RadarCon (RADAR), Kansas City, MO, 2011, pp. 895-900.

(Continued)

*Primary Examiner* — Anh V La
(74) *Attorney, Agent, or Firm* — AFMCLO/JAZ; David Franklin

(57) ABSTRACT

A receiver method and apparatus provides a more efficient computation and application of optimal filters. Range and Doppler processing in the receiver are decoupled and, as a result, computational complexity required for both filter computation and filtering stages are significantly reduced. In one embodiment, a response to an emitted signal is demodulated and sampled to provide baseband samples. The response includes a component due to interaction of the emitted signal with a target, The baseband samples are filtered in a bank of N parallel range filters to provide N filter outputs for each of the baseband samples. For one or more Doppler phase shifts φ, a discrete Fourier transform of the N filter outputs is computed to produce Doppler components that may be analyzed to determine at least one of a presence, range and speed of the target.

13 Claims, 5 Drawing Sheets

(51) Int. Cl.
*G01S 7/282* (2006.01)
*G01S 13/87* (2006.01)
*G01S 7/52* (2006.01)

(58) Field of Classification Search
CPC ........ G01S 13/536; G01S 7/35; G01S 13/904; G01S 2013/0254
USPC ............ 367/94, 93, 99, 100, 101, 112, 117; 340/901, 902, 903, 904, 943; 701/301; 342/93, 129, 59, 89
See application file for complete search history.

(56) References Cited

U.S. PATENT DOCUMENTS

| | | | |
|---|---|---|---|
| 5,173,706 | A | 12/1992 | Urkowitz |
| 5,309,161 | A | 5/1994 | Urkowitz |
| 5,414,428 | A | 5/1995 | Gallagher |
| 5,481,270 | A | 1/1996 | Urkowitz |
| 5,539,412 | A | 7/1996 | Mendelson |
| 5,646,623 | A | 7/1997 | Walters |
| 5,760,732 | A | 6/1998 | Marmarelis |
| 6,078,281 | A | 6/2000 | Milkovich |
| 6,121,915 | A | 9/2000 | Cooper |
| 6,392,588 | B1 | 5/2002 | Levanon |
| 6,583,754 | B2 | 6/2003 | Mertins |
| 6,861,976 | B2 | 3/2005 | Budic |
| 6,917,327 | B2 | 7/2005 | Jenkins |
| 7,023,376 | B1* | 4/2006 | Kuroda ................ G01S 13/345 342/70 |
| 7,053,814 | B2 | 5/2006 | Yap |
| 7,224,716 | B2 | 5/2007 | Roman |
| 7,277,044 | B2 | 10/2007 | Budic |
| 7,561,100 | B2 | 7/2009 | Shinonaga |
| 7,656,341 | B2 | 2/2010 | Reeves |
| 8,193,972 | B2 | 6/2012 | Hofele |
| 8,610,621 | B1 | 12/2013 | Alejos |
| 8,811,467 | B2 | 8/2014 | Vierinen |
| 8,928,524 | B1 | 1/2015 | Nunn |
| 9,071,337 | B2 | 6/2015 | Hellsten |
| 9,075,138 | B2 | 7/2015 | Song |
| 9,194,946 | B1 | 11/2015 | Vacanti |
| 9,473,071 | B2 | 10/2016 | Trotta |
| 9,638,789 | B2 | 5/2017 | Roger |
| 9,720,080 | B1 | 8/2017 | Rodenbeck |
| 9,825,360 | B2 | 11/2017 | Miller |
| 9,846,228 | B2 | 12/2017 | Davis |
| 9,864,043 | B2 | 1/2018 | Franceschini |
| 9,945,935 | B2 | 4/2018 | Eshraghi |
| 9,954,955 | B2 | 4/2018 | Davis |
| 9,964,636 | B1 | 5/2018 | Subramanya |
| 2003/0193430 | A1 | 10/2003 | Gresham |
| 2004/0192215 | A1* | 9/2004 | Onggosanusi ...... H04L 25/0202 455/67.13 |
| 2005/0179583 | A1 | 8/2005 | Jordan |
| 2005/0270219 | A1 | 12/2005 | Dwelly |
| 2006/0220946 | A1* | 10/2006 | Nohmi .................. G01S 7/35 342/107 |
| 2009/0295623 | A1 | 12/2009 | Falk |
| 2010/0277372 | A1 | 11/2010 | Lam |
| 2012/0092205 | A1 | 4/2012 | Bourdelais |
| 2013/0099943 | A1 | 4/2013 | Subramanya |
| 2014/0105054 | A1 | 4/2014 | Sægrov |
| 2014/0125509 | A1 | 5/2014 | Stolarczyk |
| 2014/0314180 | A1 | 10/2014 | Vierinen |
| 2015/0009049 | A1 | 1/2015 | Subramanya |
| 2015/0153447 | A1 | 6/2015 | Lee |
| 2015/0285897 | A1 | 10/2015 | Kilty |
| 2016/0103216 | A1* | 4/2016 | Whelan ................ G01S 7/2923 342/25 A |
| 2017/0090011 | A1 | 3/2017 | West |
| 2017/0153314 | A1 | 6/2017 | Siemes |
| 2017/0214746 | A1 | 7/2017 | Zettler |
| 2017/0307726 | A1 | 10/2017 | Mazzaro |
| 2018/0031673 | A1 | 2/2018 | Kim |
| 2018/0074171 | A1 | 3/2018 | Ray |
| 2018/0095161 | A1 | 4/2018 | Kellum |
| 2018/0095163 | A1 | 4/2018 | Lovberg |
| 2018/0196139 | A1 | 7/2018 | Brown |

OTHER PUBLICATIONS

S. D. Blunt, M. Cook, J. Jakabosky, J. D. Graaf and E. Perrins, "Polyphase-coded FM (PCFM) radar waveforms, part I: implementation," in IEEE Transactions on Aerospace and Electronic Systems, vol. 50, No. 3, pp. 2218-2229, Jul. 2014.

C. Sahin, J. G. Metcalf and B. Himed, "Reduced complexity maximum SINR receiver processing for transmit-encoded radar-embedded communications," 2018 IEEE Radar Conference (RadarConf18), Oklahoma City, OK, 2018, pp. 1317-1322.

C. Sahin, J. Jakabosky, P. M. McCormick, J. G. Metcalf and S. D. Blunt, "A novel approach for embedding communication symbols into physical radar waveforms," 2017 IEEE Radar Conference (RadarConf), Seattle, WA, 2017, pp. 1498-1503.

D. P. Scholnik, "Range-ambiguous clutter suppression with Pulse-diverse waveforms," 2011 IEEE RadarCon (RADAR), Kansas City, MO, 2011, pp. 336-341.

* cited by examiner

METHOD, APPARATUS AND SYSTEM FOR RECEIVING WAVEFORM-DIVERSE SIGNALS

STATEMENT OF GOVERNMENT INTEREST

The invention described herein may be manufactured, used, and licensed by or for the Government of the United States for all governmental purposes without the payment of any royalty.

BACKGROUND

When communication sequences are encoded and embedded into radar emissions, the resulting radar-embedded communication (REC) waveforms change from pulse to pulse both during and across coherent processing intervals (CPIs). The resulting radar emissions are termed. 'coding diverse' or 'waveform diverse'. Waveform diversity occurs whenever the radar waveform changes on a pulse-to-pulse basis, as in pulse-agile or adaptive radar in addition to coding diverse REC. Matched filtering of these different waveforms leads to different sidelobe structures, giving rise to the range sidelobe modulation (RSM) of clutter. The clutter RSM (C-RSM) induces residual clutter spread into the entire range-Doppler response, and thus reduces target detection performance. Filtering approaches exist that maximize the signal-to-interference-plus-noise-ratio (SINR) of pulse agile systems by joint range-Doppler processing. However, direct implementation of the maximum SINR approach to waveform diverse radar emissions, such as transmit-encoded. REC systems, leads to prohibitive computational complexity.

Accordingly, there exists a need for a reduced complexity optimal receiver for use with pulse agile/waveform diverse radar systems both pulse-to-pulse and CPI-to-CPI changing radar emissions.

BRIEF DESCRIPTION OF THE DRAWINGS

The accompanying drawings provide visual representations which will be used to more fully describe various representative embodiments and can be used by those skilled in the art to better understand the representative embodiments disclosed and their inherent advantages. The drawings are not necessarily to scale, emphasis instead being placed upon illustrating the principles of the devices, systems, and methods described herein. In these drawings, like reference numerals may identify corresponding elements.

DETAILED DESCRIPTION

Figure 1:
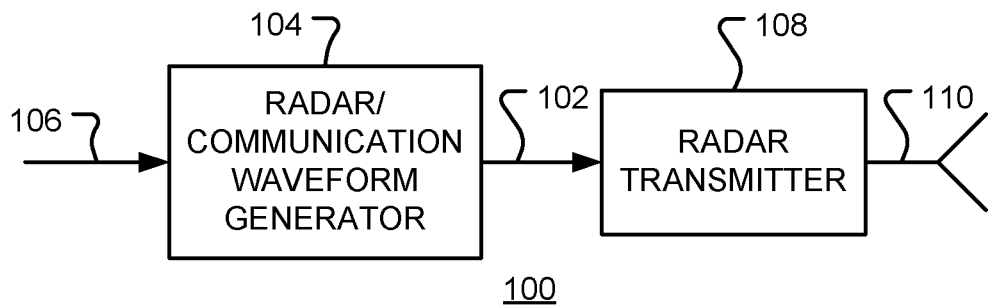
FIG. 1 is a diagram of a general coding-diverse radar system for radar-embedded communication.

The various methods, systems, apparatuses, and devices described herein generally provide a radar receiver capable of optimal processing radar signals which possess waveform or coding diversity both between pulses and between coherent processing intervals. The disclosed approach reduces computational requirements of the receiver through data rearrangement and the decoupling of range and Doppler processing.

While this disclosure is susceptible of being embodied in many different forms, there is shown in the drawings and will herein be described in detail specific embodiments, with the understanding that the present disclosure is to be considered as an example of the principles and not intended to be limited to the specific embodiments shown and described. In the description below, like reference numerals may be used to describe the same, similar or corresponding parts in the several views of the drawings.

In this document, relational terms such as first and second, top and bottom, and the like may be used solely to distinguish one entity or action from another entity or action without necessarily requiring or implying any actual such relationship or order between such entities or actions. The terms "comprises," "comprising," "includes," "including," "has," "having," or any other variations thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment," "certain embodiments," "an embodiment," "implementation(s)," "aspect(s)," or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C." An exception to this definition will occur only when a combination of elements, functions, steps or acts are in some way inherently mutually exclusive. Also, grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

All documents mentioned herein are hereby incorporated by reference in their entirety. References to items in the singular should be understood to include items in the plural, and vice versa, unless explicitly stated otherwise or clear from the text.

Recitation of ranges of values herein are not intended to be limiting, referring instead individually to any and all values falling within the range, unless otherwise indicated, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

In the following description, it is understood that terms such as "first," "second," "top," "bottom," "up," "down," "above," "below," and the like, are words of convenience and are not to be construed as limiting terms. Also, the terms apparatus and device may be used interchangeably in this text.

The radio spectrum is a fixed resource with an exponentially increasing demand from commercial communication applications. The resulting erosion of radio spectrum to meet this communication demand is creating additional strain on applications that already operate in congested and contested environments. As a result, ongoing research is focused on improving spectral efficiency (e.g. dynamic spectrum access) or developing methods to share spectrum between multiple functions (e.g. radar and communication). The notion of radar/communication spectrum sharing necessitates the use of some manner of waveform diversity through the exploitation of available time, frequency, coding, spatial, or polarization degrees-of-freedom. Waveform diversity results, for example, when a single multi-function system with radar and communication capabilities uses distinct radar waveforms as communication symbols. As a result of this coding operation, the structure of the radar emission varies from pulse to pulse in each CPI and across CPIs.

The primary challenge with waveform diversity approaches is the presence of clutter range sidelobe modulation (C-RSM), which is a side-effect of matched filtering (i.e. pulse compression). Since each waveform with embedded communication coding is unique, the associated matched filter is also unique. Therefore, the pulse compression profile of each received waveform is likewise unique, resulting in different range sidelobe structures. Further, when Doppler processing is performed across a coherent processing interval (CPI) of the received echoes, the presence of C-RSM induces a partial loss of coherency. This coherency loss results in a Doppler-independent clutter interference floor in the range-Doppler response, obscuring targets that would normally be detectable above the clutter.

To maintain acceptable radar performance, the impact of C-RSM should be reduced, which can be achieved by a combination of REC waveform design (such as phase-attached radar/communications (PARC), for example) and advanced radar receiver processing techniques.

Two receive processing approaches exist to compensate for the C-RSM effect. The first approach is to use mismatch filtering to force a common pulse compression response for the pulse-to-pulse varying REC waveforms. The joint optimization of the common pulse compression response is computationally feasible for only very low data rates (i.e. 1~2 bits/pulse), which precludes their application to coding diversity REC approaches that are designed to achieve data rates on the order of the time-bandwidth product (symbols) per pulse (e.g. PARC).

The second receive processing approach is to model the clutter return process and the noise process at the radar receiver as a single "colored" process and apply the 'maximum signal-to-interference-plus-noise-ratio' (maximum SINR) solution for joint range-Doppler processing in each CPI. The maximum SINR approach is optimal in SINR sense. An additional advantage to the maximum SINR approach, as compared to the mismatch filtering approach, is that pulse-to-pulse changes in the clutter can be incorporated into receive processing via the interference-plus-noise covariance matrix.

When the set of waveforms used remains unchanged from CPI to CPI, as in the case of pulse-agile radar for example, the optimal maximum SINR filters need be computed once, and may then be used in each CPI. This approach cannot be applied to waveform diversity REC systems since the CPI-to-CPI variations induced by the communication symbols requires the filters to be recomputed for each CPI, resulting in very high computational complexity.

One embodiment of the present disclosure is a receiver that implements a more efficient computation and application of optimal filters. This approach decouples the range and Doppler processing in the receiver and, as a result, it significantly reduces the implementation computational complexity in both filter computation and filtering stages.

FIG. 1 is a diagram of a radar system 100 for radar embedded communication (REC). Here, the signal 102 to be transmitted is generated by radar communication waveform generator 104 and contains embedded communication symbols. The signal 102 is produced by waveform generator 104 that receives a sequence of communication symbols 106 and may combine them with radar signal shaping codes. The signal 102 is passed to radar transmitter 108 that applies appropriate modulation and signal conditioning and drives antenna 110.

Figure 2:
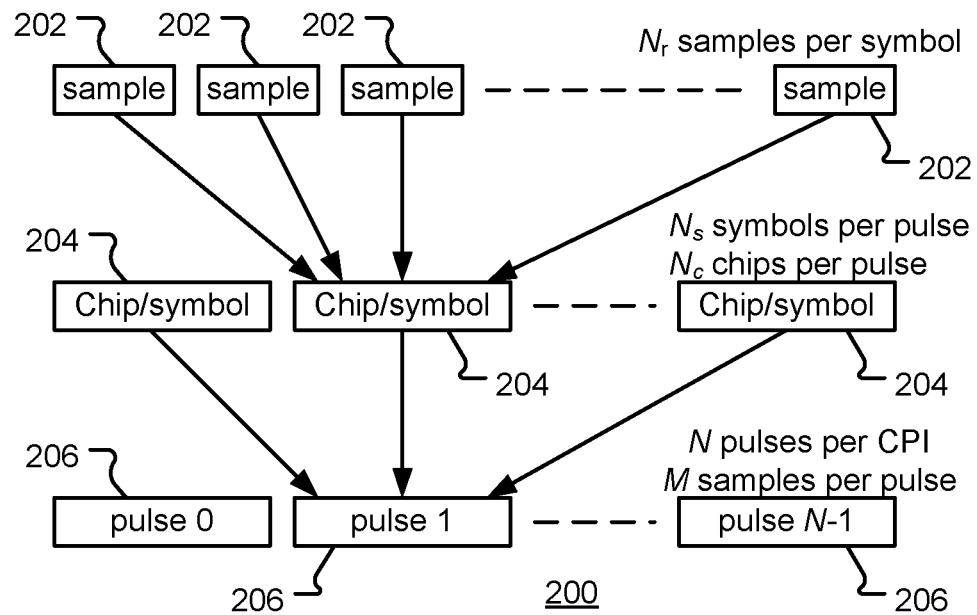
FIG. 2 is a diagrammatic representation of a signal to be transmitted in a single coherent processing interval (CPI), in accordance with a representative embodiment.

FIG. 2 is a diagrammatic representation of a signal 200 to be transmitted in a single coherent processing interval (CPI), in accordance with embodiments of the disclosure. The signal comprises a number, N, of pulses 202. Each pulse contains a number, $N_c$, of chips (radar codes) and/or a number $N_s$ of symbols 204. The number of chips is taken to be equal to the number of symbols in description below, but this is not a requirement of the disclosed approach. The symbols may be poly-phase encoded, for example. In digital form, each chip or symbol 204 consists of a number, $N_r$, of discrete values or samples 206. Thus, each pulse contains $M=N_rN_c$ samples.

Figure 3:
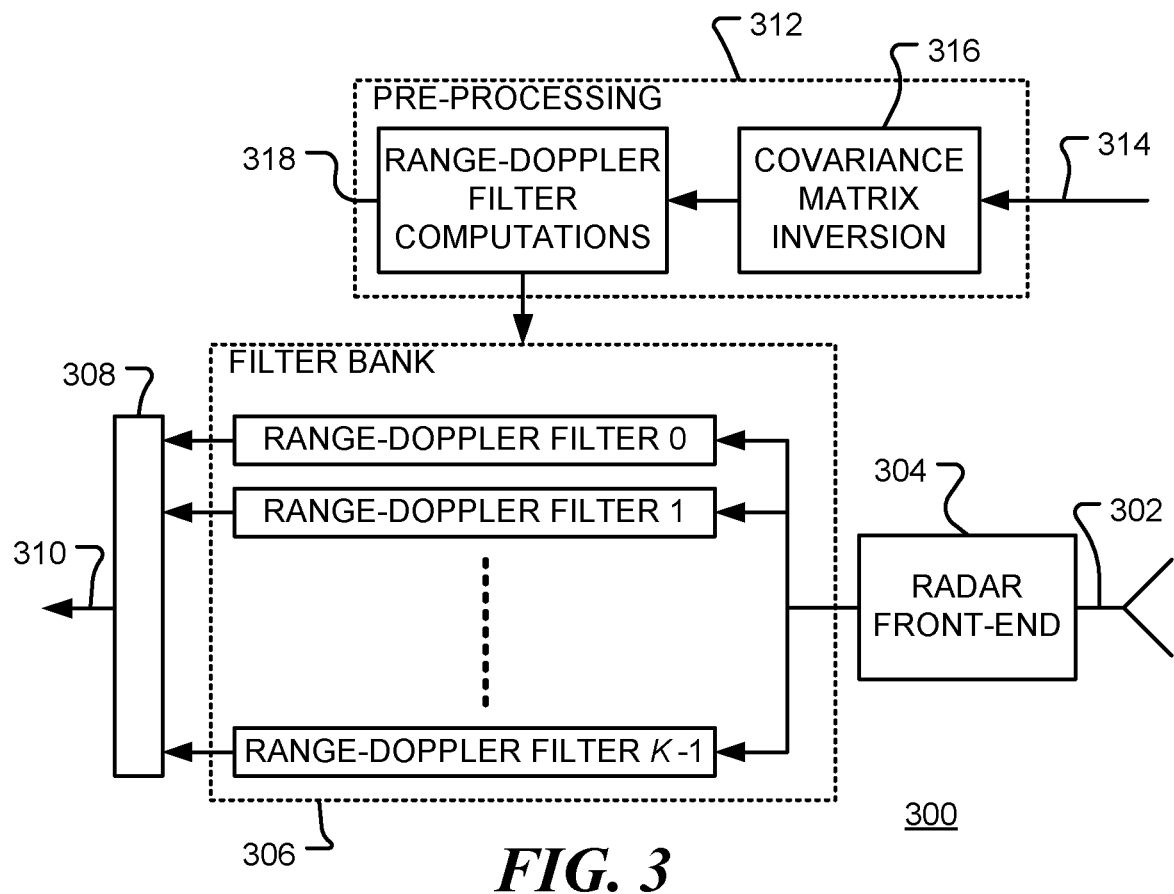
FIG. 3 is a block diagram of a radar receiver that uses direct processing of received radar signals.

FIG. 3 is a block diagram of a radar receiver 300 that uses direct processing of received radar signals. The signals are received at antenna 302 and passed to radar front-end 304. Radar front-end 304 performs processing including complex demodulation to base- and analog-to-digital conversion. The resulting complex baseband signals are passed through filter bank 306. Each filter in filter bank 306 is optimized for a specific Doppler shift across the received pulse in a CPI. In the example shown there are K Doppler shifts. The filter outputs are analyzed in 308 to determine output 310 that indicates target properties. The characteristics of the filters in the filter bank 306 are determined in pre-processor 312. Pre-processor 312 receives codes and/or symbols 314 embedded in the transmitted signal. From these codes and/or symbols, and knowledge of the clutter statistics and noise level, an interference covariance matrix is computed and inverted in computation unit 316. The inverse covariance matrix is used in computation unit 316 to determine the coefficients of the filters in the filter bank 306. In some radar systems, such as synthetic wideband radar, the radar emission changes from pulse to pulse, but the same waveform sequence is transmitted in each CPI. In that case the filter computation need only be done once, so computational efficiency is not a necessity. However, when the radar waveforms change from CPI to CPI, as in coding diversity REC, the filter computation must be performed in every CPI. In such cases, computational efficiency is paramount and the direct approach depicted in FIG. 3 is not practical.

Figure 4:
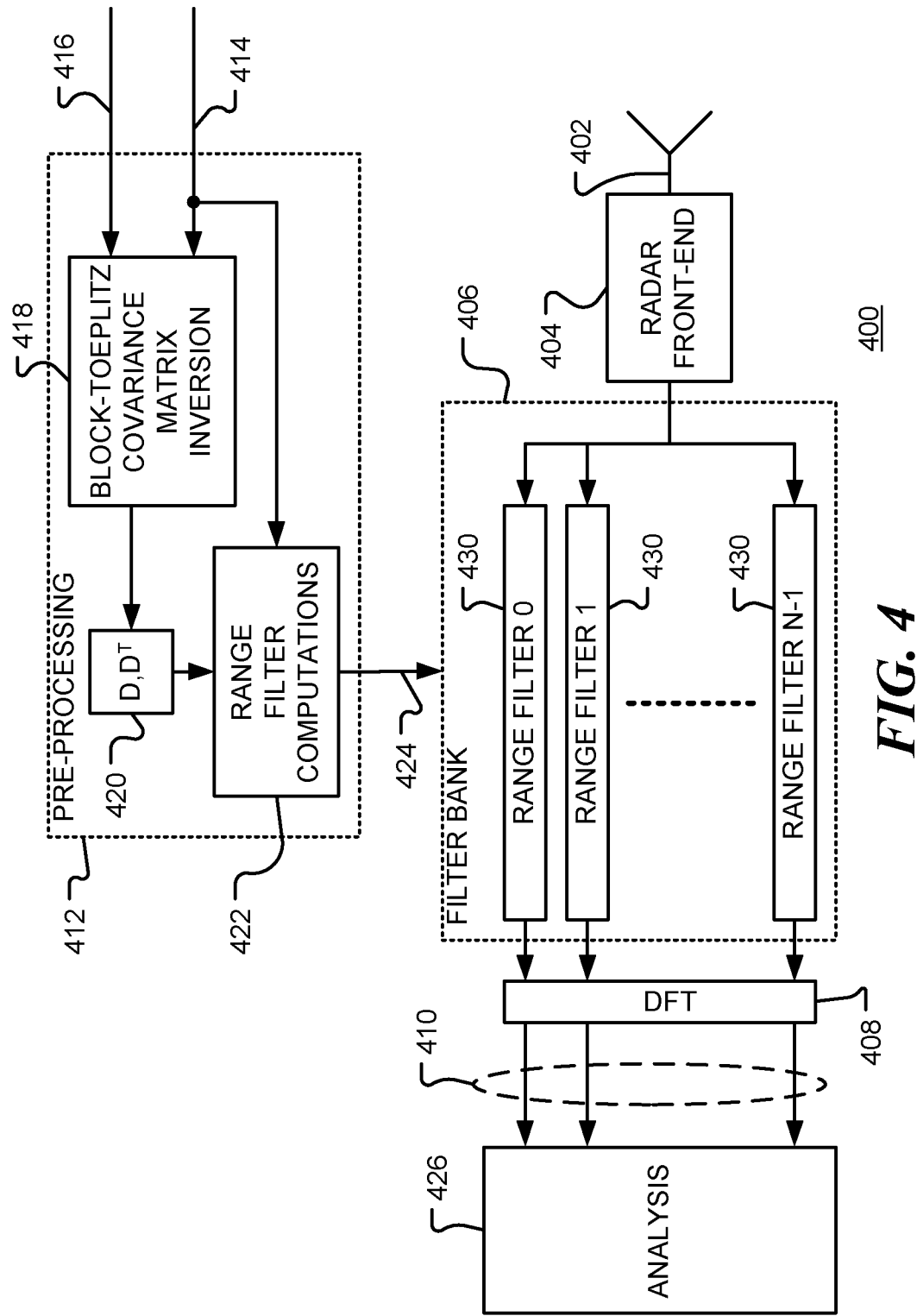
FIG. 4 is a block diagram of a radar receiver that uses reduced complexity optimal processing of received radar signals, in accordance with a representative embodiment.

FIG. 4 is a block diagram of a radar receiver 400 that uses optimized processing of received radar signals, in accordance with representative embodiments. The signals are received at antenna 402 and passed to radar front-end 404. Radar front-end 404 performs processing including complex demodulation to base- and analog-to-digital conversion. The resulting complex baseband signals are passed through filter bank 406. In the example shown there are N pulses in each CPI. The filter outputs are passed to Fourier transform unit 408, such as a fast Fourier transform (FFT) unit to provide compressed pulses 410, referred to a Doppler-compensated outputs, for a number of Doppler shifts. The characteristics of the filters in filter bank 406 are determined in pre-processor 412. Pre-processor 412 receives codes and/or symbols 414 embedded in the transmitted signal together with clutter coefficient and noise statistics 416. Computation unit 418 is configured to compute the inverse of an interference-plus-noise covariance matrix. This matrix is denoted as $\tilde{R}_{I,I}^{-1}$ and is discussed in more detail below. In accordance with a first aspect of the disclosure, the clutter data is ordered in such that the interference covariance matrix $\tilde{R}_{I,I}$ has a block Toeplitz structure. That is, the blocks along any given diagonal of the matrix are the same as one another. The block Toeplitz structure of the matrix enables a computationally efficient method to be used to invert the matrix in computation unit 418. The inverse covariance matrix is reordered in data reordering engine 420 so as to group elements according to pulse numbers. Computation unit 422 computes the coefficients 424 of the range filters 430 in the filter bank 406 from the reordered inverse covariance matrix (output from 422) and the transmitted signals 414.

In accordance with another embodiment of the disclosure, the coefficients of the range filters in filter bank 406 do not depend upon the Doppler shift. Thus, in each CPI, the filter coefficients need to be computed once, rather than for every Doppler shift. Rather, the Doppler compensated outputs 410 are provided by computing a Fourier transform of the range filter outputs in Fourier transform unit 408.

Receiver 400 is improved over previous receivers in that (a) Doppler-independent range filter coefficients are computed efficiently by inverting a block-Toeplitz covariance matrix of the interference, and (b) range and Doppler processing are decoupled. Together, these components provide a receiver that is capable of optimal (maximum signal-to-interference-plus-noise ratio (SINR)) processing of radar returns containing codes and/or symbols that vary from pulse to pulse and from CPI to CPI. Further, the receiver provides improved efficiency of processing even when the codes remain the same from CPI to CPI.

The Doppler compensated outputs 410 are passed to analysis unit 426 that is used to determine the presence or absence of a target and properties of the target such as range and relative velocity. This may be done, for example, by comparing amplitudes of the Doppler compensated outputs at various times. Various analysis techniques may be used without departing from the present disclosure. In one embodiment, analysis unit 426 compensates for the gains of the Doppler compensated outputs.

Transmitted Pulses

In a coding diversity REC system the radar waveform transmitted in each pulse is uniquely specified by the transmitted information sequence. As a new information sequence is transmitted in each pulse, the radar waveform changes from pulse to pulse in each CPI, and from CPI to CPI.

In general, the sampled complex baseband waveform of the $n^{th}$ transmitted pulse is denoted as vector $s_n = [s_{n,0}\ s_{n,1}\ \ldots\ s_{n,M-1}]^T$ of M complex samples. The N consecutive pulses of a CPI may be stacked to form a single column vector $$s = [s_0^T\ s_1^T\ \ldots\ s_{N-1}^T]^T \qquad (1)$$

Since each of the N pulses is sampled M times, the vectors has N×M elements.

Received Pulses

The response to the $n^{th}$ pulse, after complex demodulation to remove the carrier signal, is a vector of M samples $$x_n = \sqrt{P} e^{jn\phi} s_n + c_n + z_n \qquad (2)$$

where $\sqrt{P}$ is the amplitude of a reflection, $j=\sqrt{-1}$, $n\phi$ is a Doppler phase shift (in radians), assuming pulses equally spaced in time, $c_n$ is the clutter return due to the $n^{th}$ emitted pulse, $s_n$, and $z_n$ is a noise term. Together, the clutter return, noise and other similar quantities are referred to as interference.

The response from the N pulses in a coherent processing interval (CPI) can be arranged as a vector $$x = [x_0^T\ x_1^T\ \ldots\ x_{N-1}^T]^T. \qquad (3)$$

Again, each of the N pulses is sampled M times, so the vector has N×M elements.

Pulse Compression or Filtering

Referring again to FIG. 3, the output 310 from the pulse compression filter of the receiver, denoted as y is a sum of the filtered responses. The output y at a particular time is a weighted sum of the inputs and is given by $$y = \sum_{n=0}^{N-1} h_n^T x_n, \qquad (4)$$

where $h_n$ are weight vectors applied to the inputs and correspond to the coefficients of the filters in filter bank 306.

Filter Design

In the absence of a reflection from a target, the response is just interference, i.e. a combination of clutter return and noise. The clutter return is dependent on the transmitted signal and so varies from pulse to pulse and from CPI to CPI. The interference can be minimized by minimizing the expected square output, $E(|y|^2)$, with respect to the vector h. However, the components of h are constrained such that the response to a hypothetical moving target is undistorted. The constraint for unity gain can be written as $$\sum_{n=0}^{N-1} h_n^T e^{jn\phi} s_n = h^T Sv = 1, \quad (5)$$

where $e^{jn\phi}$ is Doppler phase factor due to movement of the target, the vector $h=[h_0^T \, h_1^T \ldots h_{N-1}^T]^T$ is a concatenation of the weight vectors, and $$S = \begin{bmatrix} s_0 & \ldots & 0 & 0 \\ 0 & s_1 & \ldots & 0 \\ \vdots & \ddots & \ddots & \vdots \\ 0 & 0 & \ldots & s_{N-1} \end{bmatrix}, v = \begin{bmatrix} 1 \\ e^{j\phi} \\ \vdots \\ e^{j(N-1)\phi} \end{bmatrix}. \quad (6)$$

The matrix S has dimensions NM×N and is block diagonal. The output from the pulse compression filter at a particular time is $$y = \sum_{n=0}^{N-1} h_n^T x_n = h^T x. \quad (7)$$

The optimal filter coefficients are found by minimizing the cost function $$J = E(|y|^2) + \lambda_1(1 - \text{real}(h^T Sv)) + \lambda_2 \text{imag}(h^T Sv) \quad (8)$$

$$= h^T E(xx^*)\bar{h} + \lambda_1\left(1 - \frac{1}{2}h^T Sv - \frac{1}{2}v^* S^* \bar{h}\right) +$$

$$\lambda_2\left(\frac{1}{2}h^T Sv - \frac{1}{2}v^* S^* \bar{h}\right),$$

where the superposed star denotes a conjugate transpose.
This is minimized when $$\frac{\partial J}{\partial \bar{h}} = h^T R_{I,I} - \frac{1}{2}(\lambda_1 + \lambda_2)v^* S^* = 0,$$

which gives $$h^T = \frac{1}{2}(\lambda_1 + \lambda_2)v^* S^* R_{I,I}^{-1}, \quad (9)$$

where $$R_{I,I} = E(xx^*) = R_{C,C} + \sigma_z^2 I_{NM} \quad (10)$$

is the covariance of the interference, i.e. the covariance of the response when no target is present. $R_{C,C}$ is the covariance matrix for the clutter, $\sigma_z^2$ is the noise power and $I_{NM}$ is the NM×NM identity matrix.

To satisfy the constraint, $$\frac{1}{2}(\lambda_1 + \lambda_2) = \frac{1}{v^* S^* R_{I,I}^{-1} Sv} = g(\phi).$$

This gain factor $g(\phi)$, which depends on the Doppler angle $\phi$, may be applied at the output of the filter. In the sequel, the concatenation of range filters is defined as $$h^T(\phi) = v^* S^* R_{I,I}^{-1} \quad (11)$$

and the final output $y'(\phi)$ is given by $$y(\phi) = v^*(\phi)S^* R_{I,I}^{-1} x \quad (12)$$

$$y'(\phi) = g(\phi)y(\phi).$$

The output value $y(\phi)$ compensates for motion with Doppler shift $\phi$, and is termed a 'Doppler compensated output'. In the description below, the gain factor is omitted, but may be applied at the output, if desired, to facilitate comparison of outputs for different values of $\phi$.

In a direct implementation, as shown in FIG. 3, the coefficients of the $k^{th}$ range-Doppler filter are $h(\phi_k)$ for Doppler shift $\phi_k$.

A different approach is taken in the receiver shown in FIG. 4. Denoting $H = S^* R_{I,I}^{-1}$, it is noted that the matrix H is a N×NM matrix that is independent of the Doppler shift $\phi$. Partitioning the matrix H by rows $\hat{h}_n^T$ gives $$y(\phi) = h^T x = v^* S^* R_{I,I}^{-1} x = \sum_{n=0}^{N-1} e^{-jn\phi} \hat{h}_n^T x, \quad (13)$$

where $$H = S^* R_{I,I}^{-1} = \begin{bmatrix} \hat{h}_0^T \\ \hat{h}_1^T \\ \vdots \\ \hat{h}_{N-1}^T \end{bmatrix}. \quad (14)$$

The rows $\hat{h}_n^T$ provide the coefficients for the N range filters in FIG. 4. These coefficients are independent of the Doppler shift, so the filters in FIG. 4 are referred to as range filters. From equation (13), it can be seen that the output y is obtained as a discrete Fourier transform of the filter outputs, namely $$y(\phi) = \sum_{n=0}^{N-1} e^{-jn\phi} \hat{h}_n^T x. \quad (15)$$

The Doppler factors, $e^{-jn\phi}$ in equation (13) are introduced in the discrete Fourier transform unit 408 in FIG. 4. Multiple Doppler compensated outputs are obtained in this manner with reduced computation. It is noted that all pulses are passed through each of the N filters.

Block Toeplitz Structure for Clutter Covariance Matrix

The interference is a sum of the clutter response and noise. The clutter response results from scattering of the radar pulse by objects or surfaces other than the intended targets. The clutter response at time sample i in the response to the $n^{th}$ pulse is modeled as $$c_{i,n} = \sum_{l=0}^{M-1} \gamma_{n,i-l} s_{n,l}, \quad (16)$$

for i=0, 1, ..., M−1 and n=0, 1, ..., N−1, where the clutter coefficients $\gamma$ for a given pulse are modeled as a complex-valued white random sequence. The pulse cross-correlation function of coefficients in pulse n and coefficients in pulse m is $$E(\gamma_{n,i}\bar{\gamma}_{m,i+j}) = R_{\Gamma,\Gamma}(n-m)\delta_{j0}, \quad (17)$$

where $R_{\Gamma,\Gamma}(n-m)$ is element n−m of the pulse cross-correlation function of the clutter coefficients, $\gamma$, and where $\delta$ is the Kronecker delta ($\delta_{nm}=1$ when n=m, $\delta_{nm}=0$ otherwise). It is assumed that the statistics of the clutter process $R_{\Gamma,\Gamma}(n-m)$ are known at the radar receiver. Likewise, the variance of the complex-valued white additive Gaussian noise samples, denoted as $\sigma_z^2$, is known at the radar receiver.

When the radar waveform changes from pulse to pulse, but the emitted sequence of pulses does not change from CPI to CPI, the inverse of the interference-plus-noise covariance matrix and the respective Doppler-specific receive filters are computed once, stored, and reused in each CPI. However, with radar-embedded communication systems and other adaptive systems, the radar waveforms not only change from pulse to pulse within a CPI, but also change from CPI to CPI since information and hence communication sequences are random by nature. In other words, $R_{I,I}^{-1}$ is a random matrix that changes independently from CPI to CPI. In this case, the resulting computational complexity per CPI is very high. In particular, the number of operations required to compute the inverse matrix $R_{I,I}^{-1}$ is $O(N^3M^3)$.

The correlation of clutter samples is $$E(c_{i,n}\bar{c}_{j,m}) = E\left(\sum_{l=0}^{M-1}\gamma_{n,i-l}s_{n,l}\sum_{k=0}^{M-1}\bar{\gamma}_{m,j-k}\bar{s}_{m,k}\right) \quad (18)$$

$$= \sum_{k=0}^{M-1}\sum_{l=0}^{M-1} E(\gamma_{n,i-l}\bar{\gamma}_{m,j-k})s_{n,l}\bar{s}_{m,k}$$

$$= \sum_{k=0}^{M-1}\sum_{l=0}^{M-1} R_{\Gamma,\Gamma}(n-m)\delta_{i-l,j-k}E(\gamma_{n,i-l}\bar{\gamma}_{m,j-k})s_{n,l}\bar{s}_{m,k}$$

$$= R_{\Gamma,\Gamma}(n-m)\sum_{l=0}^{M-1} s_{n,l}\bar{s}_{m,l+j-i}.$$

Hence, for a given n and m, the clutter correlation values depend only on the difference value i−j.

Using this property, an aspect of the disclosure recognizes that the elements of the interference covariance matrix $R_{I,I}$ be reordered to have a block Toeplitz data structure. It is known that efficient, iterative, methods may be used to compute the inverse of such as matrix. For a reordering matrix that satisfies $D^TD=DD^T=I$, the interference covariance matrix can be written as $$R_{I,I} = D^TDR_{I,I}D^TD = D^T\tilde{R}_{I,I}D \quad (19)$$

where $$\tilde{R}_{I,I} = DR_{I,I}D^T,$$

$$R_{I,I}^{-1} = D^T\tilde{R}_{I,I}^{-1}D, \quad (20)$$

Figure 5:
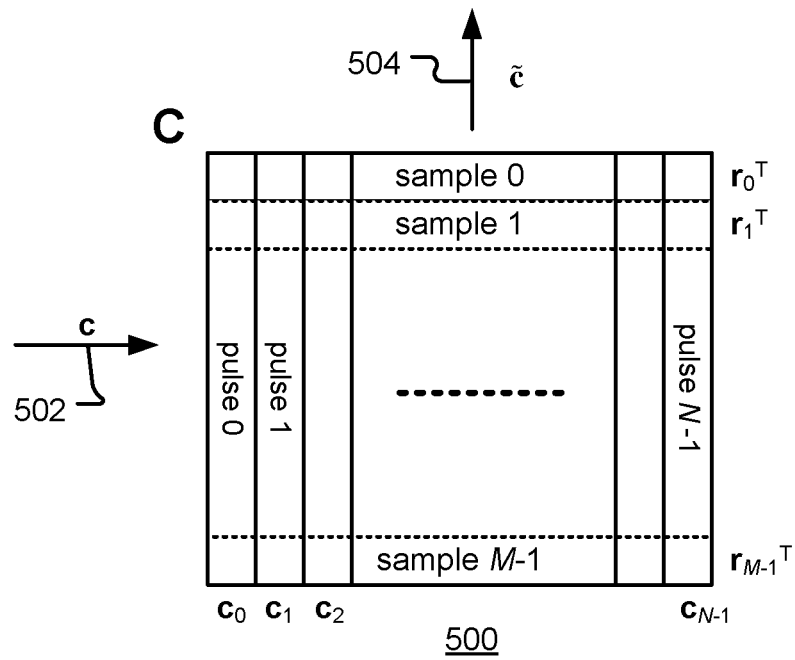
FIG. 5 is a diagrammatic representation of a clutter matrix reordering, in accordance with a representative embodiment.

FIG. 5 is a diagrammatic representation showing reordering of a clutter matrix C 500. A component $c_{i,n}$ in row i and column n of the matrix corresponds to the clutter return at time i in the response to pulse n. The clutter matrix may be written as in row or column form as $$C = [c_0 \; c_1 \; \ldots \; c_{N-1}] = \begin{bmatrix} r_0^T \\ r_1^T \\ \vdots \\ r_{M-1}^T \end{bmatrix}. \quad (21)$$

A reordering matrix D is defined as the NM×N×M matrix that reorders the vector $c=[c_0^T \; c_0^T \; \ldots \; c_{N-1}^T]^T$ to a vector $\tilde{c}=Dc=[r_0^T \; r_1^T \; \ldots \; r_{M-1}^T]^T$. Thus, $[c]_{i+Mj}=c_{ij}=[\tilde{c}]_{j30 \; Ni}$ The reordering matrix has components $D_{(j+Ni)(k+Ml)}=\delta_{ik}\delta_{jl}$ and satisfies $D^TD=DD^T=I$, where $\delta$ is the Kronecker delta. In FIG. 5, a clutter vector c, ordered by pulses, is used to fill the matrix one column at a time, as indicated by arrow 502. The reordered clutter vector $\tilde{c}$ is obtained by taking samples from the matrix one row at a time, as indicated by arrow 504.

The clutter covariance matrix is given by $$R_{C,C} = E\{cc^*\} = E\left\{\begin{bmatrix} c_0 \\ c_1 \\ \vdots \\ c_{N-1} \end{bmatrix}[c_0^* \; c_1^* \; \ldots \; c_{N-1}^*]\right\} \quad (22)$$

where $E\{.\}$ denotes an expected value.

The covariance matrix of the reordered clutter is given by $$\tilde{R}_{C,C} = DR_{C,C}D^T = E\{\tilde{c}\tilde{c}^*\} = E\left\{\begin{bmatrix} r_0 \\ r_1 \\ \vdots \\ r_{M-1} \end{bmatrix}[r_0^* \; r_1^* \; \ldots \; r_{M-1}^*]\right\}, \quad (23)$$

in which the block in the $i^{th}$ row and $j^{th}$ column is given by $$[\tilde{R}_{C,C}]_{i,j} = E[r_ir_j^*]. \quad (24)$$

In component form, $$[r_ir_j^*]_{nm} = r_{i,n}\bar{r}_{j,m} = c_{in}\bar{c}_{jm}. \quad (25)$$

The covariance matrix of the clutter is therefore a block Toeplitz matrix. The covariance matrix of the noise is $\sigma_z^2 I_{N\times M}$ where $I_{N\times M}$ is the identity matrix of size N×M so the covariance matrix of the interference also has a block Toeplitz structure with blocks $$[\tilde{R}_{C,C}] = \tilde{R}_{C,C}(i-j), \quad (26)$$

where $\tilde{R}_{C,C}(i-j)=[\tilde{R}_{C,C}]_{i,j}$. The interference matrix is also block Toeplitz with block i,j given by $$[\tilde{R}_{I,I}]_{i,j} = \tilde{R}_{C,C}(i-j) + \delta_{ij}I_N\sigma_z^2. \quad (27)$$

The coefficient matrix H of the range filters in FIG. 4 is $$H = S^*D^T\tilde{R}_{I,I}^{-1}D. \quad (28)$$

The number of operations required to compute the inverse matrix $\tilde{R}_{I,I}^{-1}$ is $O(N^3M^2)$.

Equivalently, the equation $$(h^TD^T)R_{I,I} = (S^*D^T) \quad (29)$$

can be solved for h using a fast algorithm.

Summary of Method

Figure 6:
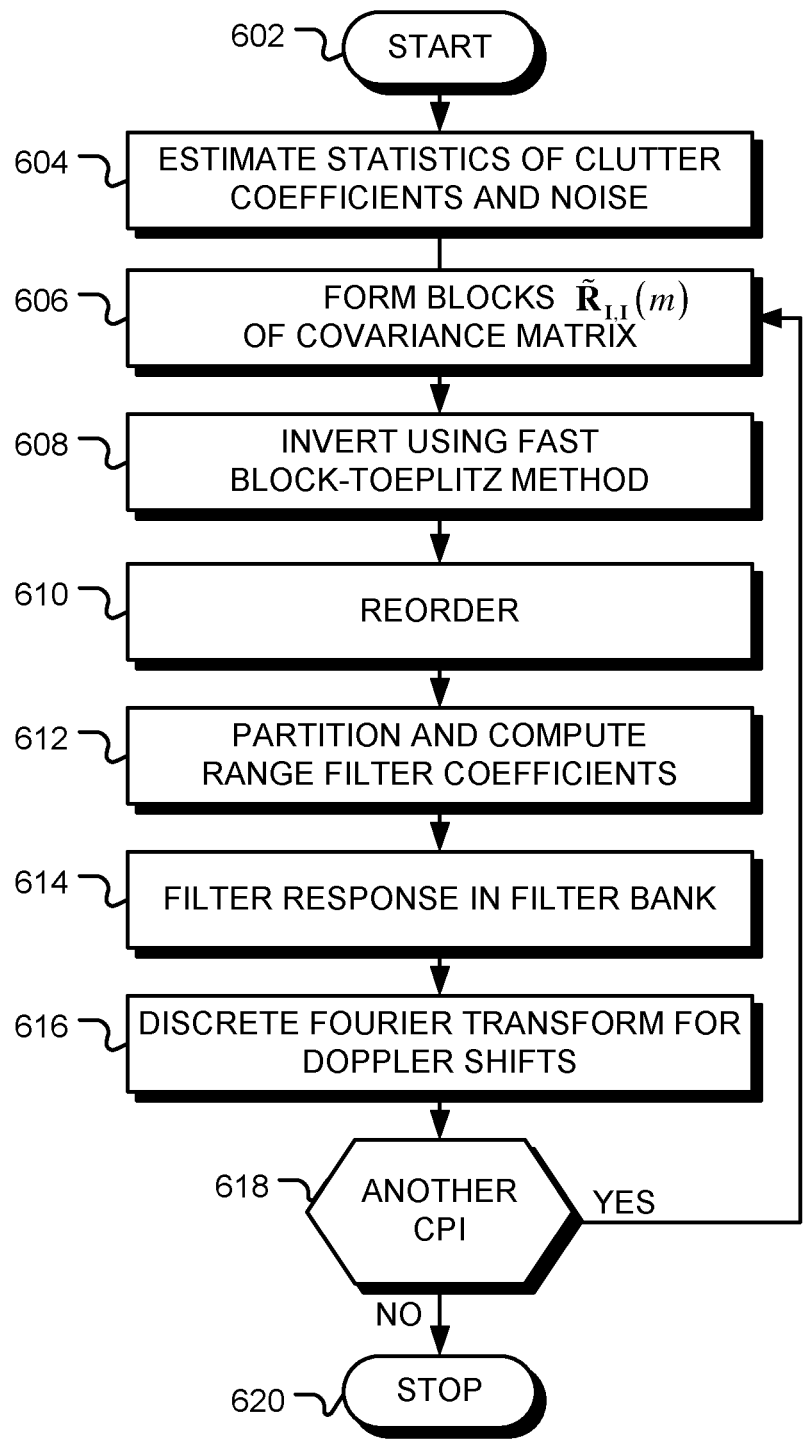
FIG. 6 is a flow chart of a method for pulse compression in a radar receiver, in accordance with a representative embodiment.

FIG. 6 is a flow chart of a method 600 for pulse compression in a radar receiver in accordance with representative embodiments. Following start block 602, the statistics of the clutter coefficients and the noise are estimated at block 604. This may be the pulse-to-pulse or slow-time covariance matrix $R_{\Gamma,\Gamma}$ for the clutter coefficients and the power of the noise. At block 606, the blocks $\tilde{R}_{I,I}(m)$ of the covariance matrix of the reordered interference are computed for m=0, 1, ..., M−1. This matrix depends upon the signal transmitted in a particular coherent processing interval (CPI). At block 608, the covariance matrix is inverted using a fast block-Toeplitz method. The inverted matrix is $\tilde{R}_{I,I}^{-1}$ reordered at block 610 to produce $D^T \tilde{R}_{I,I}^{-1} D$. At block 612, the reordered inverse matrix $R_{I,I}^{-1}$ is partitioned and the range filter coefficients $\hat{h}_n^T = s*_n [D\tilde{R}_{I,I}^{-1} D^T]_n$ are computed. At block 614, the received signal is filtered in the filter bank, to give filter outputs $y_n = \hat{h}_n^T x$, and, at block 616, the filter bank outputs are Fourier transformed as $$y = \sum_{n=0}^{N-1} e^{-jn\phi} y_n$$

to give final outputs for Doppler shift $\phi$. A fast Fourier transform may be used to provide outputs for multiple Doppler shifts. This completes the processing for one CPI. If signals received in another CPI are to be processed, as depicted by the positive branch from decision block 618, flow returns to block 606. Otherwise, as depicted by the negative branch from decision block 618, the method terminates at block 620.

Filter Implementation

Figure 7:
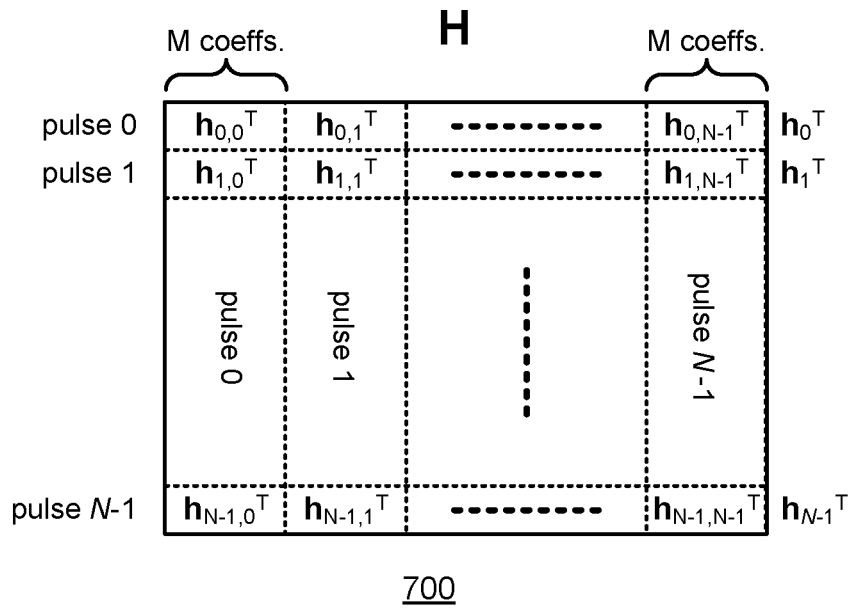
FIG. 7 is a diagrammatic representation of a matrix of filter coefficients, in accordance with a representative embodiment.

The filter matrix H may be partitioned, as shown in FIG. 7, into rows and columns. The output can be written as $$y(\phi) = \sum_{n=0}^{N-1} e^{-jn\phi} \hat{h}_n^T x = \sum_{n=0}^{N-1} e^{-jn\phi} \sum_{m=0}^{N-1} \hat{h}_{n,m}^T x_m. \quad (30)$$

where $\hat{h}_{n,m}^T$ is the block in row n and column m of the matrix 700.

Figure 8:
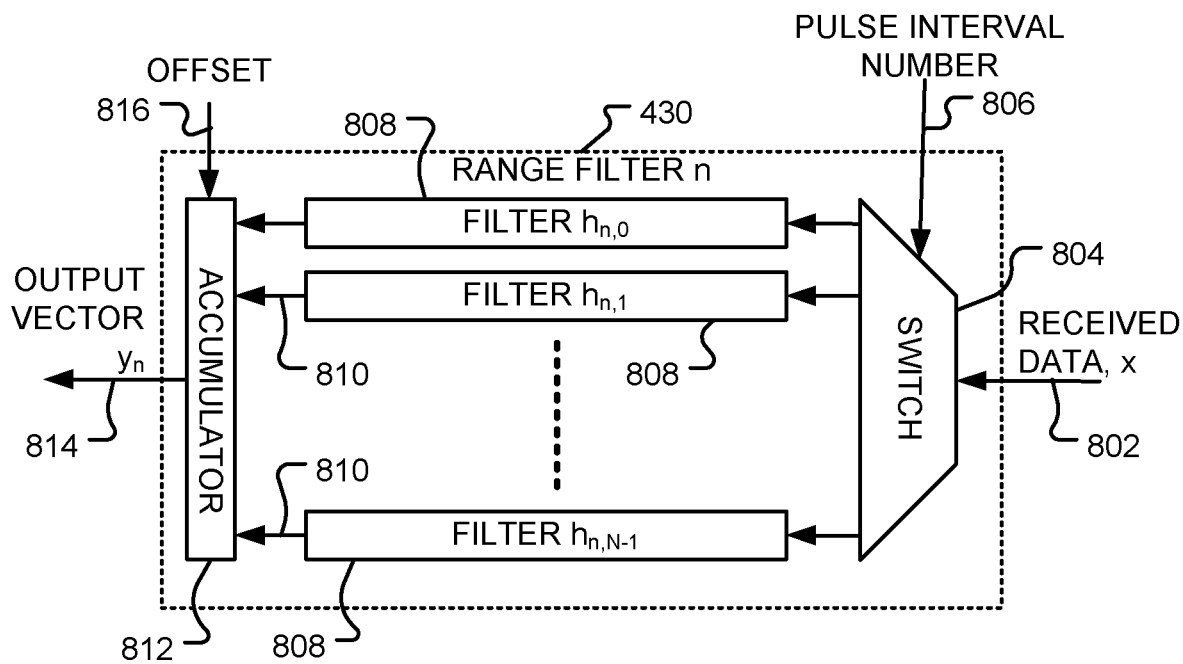
FIG. 8 is a block diagram showing an implementation of a range filter, in accordance with a representative embodiment.

FIG. 8 is a block diagram showing an implementation of the $n^{th}$ range filter 430, consistent with embodiments of the disclosure. Received samples 802 for a particular pulse are passed to switch 804. The switch is controlled by signal 806 that selects the switch output dependent upon which particular pulse is being received. The samples are passed to corresponding filter 808. For example, received samples $x_m$ are passed to filter with coefficients $\hat{h}_{n,m}^T$. The filtering operation produces a sequence of outputs 810. The time-aligned sequences from each filter 808 are summed in accumulator 812 to produce a combined output sequence 814. The sequences are time-aligned to the output pulse using offset 816. The combined output sequence 814 is fed to the DFT unit (408 in FIG. 4).

Receiver Processing Requirement

For comparison of processing efficiency, the number of computations in one coherent processing interval (CPI) is compared for a direct approach and the disclosed approach. In each pulse repetition interval (PRI) the radar transmits a pulse of duration M samples and then switches to receive mode and records all received samples until the next PRI. In each PRI approximately $L = N_r * B / PRF$ samples are recorded where B is the bandwidth and PRF is the pulse repetition frequency.

The results may be displayed as K×L image, with Doppler values on one axis and time (sample) values on the other axis.

Example Value Ranges

N=number of pulses in CPI (typically between 16 and 256).

K=number of Doppler shifts (typically 2 or 4 times N).

M=number of samples in each pulse=filter length (typically between 32 and 1024).

L=number of received samples to be filtered in each PRI (typically 50 to 100 times M).

Computation of the inverse of the interference-plus-noise covariance matrix requires approximately $N^3 \times M^2$ operations (such as multiplications or multiply-accumulates). In comparison, a direct approach requires $N^3 \times M^3$ operations, which is a factor of M more than the disclosed approach.

Computation of the filter coefficients from the inverse matrix uses $(N \times M)^2$ complex operations. In comparison, the direct approach uses $K \times (N \times M)^2$ complex operations.

The filter matrix H contains $N^2$ filters of length M so range filtering requires $N^2 \times M \times L$ operations in direct form. The produces N output vectors of length L. However, the filtering operation may be performed using a Fast Fourier transform. Three transforms are required, one for the data, one for the filter coefficients and one for the inverse transform. The transforms are length L+M. In addition, L+M multiplications are required for the frequency domain filter. In many applications, M is small compared to L and the total number of complex operations is approximately $N^2 \times (3L \times \log_2(L) + L)$. In comparison, the direct approach uses $N \times K \times (3L \times \log_2(L))$ complex operations.

The FFT stage for Doppler processing requires approximately $L \times K \log_2(K)$, which is typically much less than the range filtering.

The number of operations for each stage of the processing is listed in TABLE 1, below.

TABLE 1

| | Covariance matrix inversion | Filter computation | Filtering |
|---|---|---|---|
| Direct Implementation | $O(N^3 \times M^3)$ | $K \times (N \times M)^2$ | $N \times K \times (3L \times \log_2(L))$ |
| Disclosed Implementation | $O(N^3 \times M^3)$ | $N^2 \times M^2$ | $N^2 \times (3L \times \log_2(L) + L) + L \times K \log_2(K)$ |

TABLE 2 lists the number of complex operations for each stage for an implementation with N=32 pulses, M=32 samples, K=4N=128 shifts, and L=100M=3200 samples.

TABLE 2

| | Covariance matrix inversion | Filter computation | Filtering |
|---|---|---|---|
| Direct Implementation | 1,073,741,284 | 134,217,728 | 470,962,256 |
| Disclosed Implementation | 33,554,432 | 1,048,576 | 120,607,764 |

The disclosed implementation has approximately 10% of the processing requirement of the direct approach in this example. All stages of the disclosed implementation require fewer operations.

TABLE 3 lists the number of complex operations for each stage for an implementation with N=64 pulses, M=64 samples, K=4N=256 shifts, and L=100M=6400 samples.

TABLE 3

|  | Covariance matrix inversion | Filter computation | Filtering |
|---|---|---|---|
| Direct Implementation | 68,719,476,736 | 4,294,967,296 | 4,082,270,844 |
| Disclosed Implementation | 1,073,741,824 | 16,777,216 | 1,033,674,911 |

The disclosed implementation has approximately 3% of the processing requirement of the direct implementation in this example. Again, all stages of the disclosed implementation require fewer operations.

The above systems, devices, methods, processes, and the like may be realized in hardware, software, or any combination of these suitable for a particular application. The hardware may include a general-purpose computer and/or dedicated computing device. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled, or executed to run on one of the above devices, as well as heterogeneous combinations of processors, processor architectures, or combinations of different hardware and software. In another implementation, the methods may be embodied in systems that perform the steps thereof, and may be distributed across devices in a number of ways. At the same time, processing may be distributed across devices such as the various systems described above, or all of the functionality may be integrated into a dedicated, standalone device or other hardware. In another implementation, means for performing the steps associated with the processes described above may include any of the hardware and/or software described above. All such permutations and combinations are intended to fall within the scope of the present disclosure.

Embodiments disclosed herein may include computer program products comprising computer-executable code or computer-usable code that, when executing on one or more computing devices, performs any and/or all of the steps thereof. The code may be stored in a non-transitory fashion in a computer memory, which may be a memory from which the program executes (such as random-access memory associated with a processor), or a storage device such as a disk drive, flash memory or any other optical, electromagnetic, magnetic, infrared or other device or combination of devices. In another implementation, any of the systems and methods described above may be embodied in any suitable transmission or propagation medium carrying computer-executable code and/or any inputs or outputs from same.

It will be appreciated that the devices, systems, and methods described above are set forth by way of example and not of limitation. Absent an explicit indication to the contrary, the disclosed steps may be modified, supplemented, omitted, and/or re-ordered without departing from the scope of this disclosure. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context.

The method steps of the implementations described herein are intended to include any suitable method of causing such method steps to be performed, consistent with the patentability of the following claims, unless a different meaning is expressly provided or otherwise clear from the context. So, for example performing the step of X includes any suitable method for causing another party such as a remote user, a remote processing resource (e.g., a server or cloud computer) or a machine to perform the step of X. Similarly, performing steps X, Y, and Z may include any method of directing or controlling any combination of such other individuals or resources to perform steps X, Y, and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It should further be appreciated that the methods above are provided by way of example. Absent an explicit indication to the contrary, the disclosed steps may be modified, supplemented, omitted, and/or re-ordered without departing from the scope of this disclosure.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the scope of this disclosure and are intended to form a part of the disclosure as defined by the following claims, which are to be interpreted in the broadest sense allowable by law.

The various representative embodiments, which have been described in detail herein, have been presented by way of example and not by way of limitation. It will be understood by those skilled in the art that various changes may be made in the form and details of the described embodiments resulting in equivalent embodiments that remain within the scope of the appended claims.

The invention claimed is:

1. A method for processing a response to an emitted signal, where the emitted signal comprises a sequence of N transmitted pulses, the method comprising:
demodulating and sampling, by a demodulation unit, a response to the emitted signal to provide a plurality of baseband samples, where the response includes a component due to interaction of the emitted signal with a target;
for a plurality of times t,
for each filter of a bank of N parallel filters, filtering, using a filter bank, the plurality of baseband samples to provide N filter outputs;
for one or more Doppler phase shifts $\phi$, computing, using a transform unit, a discrete Fourier transform of the N filter outputs to produce one or more Doppler components; and
analyzing, by an analysis unit, the one or more Doppler components to determine at least one of a presence, range and speed of the target, where:
coefficients of the N filters are based, at least in part, on the N transmitted pulses and an inverse covariance matrix of interference in the plurality of baseband samples and where coefficients of the N filters are independent of the one or more Doppler shifts,
the N parallel filters are characterized by filter coefficients that based, at least in part, on an inverse of a covariance matrix of interference in the plurality of baseband samples, and
the method further comprising:
determining the covariance matrix of interference in the plurality of baseband samples;
ordering elements of the covariance matrix to form a block-Toeplitz matrix;
determining the inverse of the covariance matrix of interference in the plurality of baseband samples from the block-Toeplitz matrix,
partitioning the inverse covariance matrix of interference in the plurality of baseband samples into N partitions; and
determining filter coefficients of a filter of the filter bank from a partition of the inverse covariance matrix of interference and a corresponding transmitted pulse of the N transmitted pulses.

2. The method of claim 1, where analyzing the one or more Doppler components comprises:
identifying a time $t_0$ and Doppler phase shift $\phi_0$ for which the transformed output has the largest amplitude; and
determining the at least one of the presence, range and speed of the target from the identified time $t_0$ and the identified Doppler shift $\phi_0$.

3. The method of claim 1, where the interference in the plurality of baseband samples is, at least in part, due to clutter, and where determining the covariance matrix of interference in the plurality of baseband samples is dependent upon the emitted signal and a covariance matrix of clutter coefficients.

4. The method of claim 3, where the interference is, at least in part, due to noise, and where determining the covariance matrix of interference in the plurality of baseband samples is dependent upon a power level of the noise.

5. A method of comprising:
encoding, by a transmitter, a sequence of symbols to provide a waveform;
modulating, by the transmitter, the waveform to provide a pulse of N transmitted pulses;
emitting, by the transmitter, a signal comprising a sequence of N transmitted pulses;
demodulating and sampling, by a demodulation unit, a response to the emitted signal to provide a plurality of baseband samples, where the response includes a component due to interaction of the emitted signal with a target;
for a plurality of times t,
for each filter of a bank of N parallel filters, filtering, by a filter bank, the plurality of baseband samples to provide N filter outputs;
for one or more Doppler phase shifts $\phi$, computing, using a transform unit, a discrete Fourier transform of the N filter outputs;
identifying, by an analysis unit, a time $t_0$ and Doppler phase shift $\phi_0$ for which the transformed output has the largest amplitude;
determining, by the analysis unit at least one of a presence, range and speed of the target from the identified time $t_0$ and the identified Doppler shift $\phi_0$; where:
the N parallel filters are characterized by filter coefficients, the method further comprising determining the filter coefficients dependent upon the sequence of symbols; and
the filter coefficients are determined, at least in part, based on an inverse of a covariance matrix of interference in the plurality of baseband samples, the method further comprising:
determining the covariance matrix of interference in the plurality of baseband samples;
ordering elements of the covariance matrix to form a block-Toeplitz matrix;
determining the inverse of the covariance matrix of interference in the plurality of baseband samples from the block-Toeplitz matrix;
partitioning the inverse covariance matrix of interference in the plurality of baseband samples into N partitions; and
determining filter coefficients of a filter of the filter bank from a partition of the inverse covariance matrix of interference and a corresponding transmitted pulse of the N transmitted pulses.

6. An apparatus comprising:
a demodulation unit configured to:
receive a response to an emitted signal, where the response comprises N response pulses each corresponding to a pulse of a sequence of N transmitted pulses, and where the response includes a component due to interaction of the transmitted pulses with a target; and
demodulate and sample the received response to provide a plurality of baseband samples;
a filter bank comprising N filters, each configured to receive the plurality of baseband samples and produce N filter outputs therefrom;
a transform unit configured to compute a discrete Fourier transform of the N filter outputs to produce one or more Doppler components; and
an analysis unit configured to monitor the one or more Doppler components and determine at least one of a presence, range and speed of the target therefrom, where:
coefficients of the N filters are based, at least in part, on the N transmitted pulses and an inverse covariance matrix of interference in the plurality of baseband samples and where coefficients of the N filters are independent of the one or more Doppler shifts, the N parallel filters are characterized by filter coefficients that based, at least in part, on an inverse of a covariance matrix of interference in the plurality of baseband samples, and the analysis unit is further configured to:
- determine the covariance matrix of interference in the plurality of baseband samples;
- order elements of the covariance matrix to form a block-Toeplitz matrix;
- determine the inverse of the covariance matrix of interference in the plurality of baseband samples from the block-Toeplitz matrix,
- partition the inverse covariance matrix of interference in the plurality of baseband samples into N partitions; and
- determine filter coefficients of a filter of the filter bank from a partition of the inverse covariance matrix of interference and a corresponding transmitted pulse of the N transmitted pulses.

7. The apparatus of claim 6, where the N filters of the filter bank are configured to maximize a signal-to-interference-and-noise ratio (SINR) in the Doppler components.

8. The apparatus of claim 6, further comprising a pre-processor, configured to determine coefficients of the N filters of the filter bank based at least in part on statistical properties of the interference and on the sequence of N transmitted pulses.

9. The apparatus of claim 6, where the emitted signal and response to the emitted signal comprise radar signals.

10. The apparatus of claim 6, further comprising a transmitter configured to:
- produce a waveform from a sequence of codes;
- modulate the waveform to provide the sequence of N transmitted pulses; and
- emit the sequence of N transmitted pulses.

11. The apparatus of claim 10, where the sequence of codes comprises a sequence of communication symbols.

12. The apparatus of claim 10, where the sequence of codes comprises a sequence of radar signal shaping codes.

13. The apparatus of claim 10, where the transmitter comprises a radar transmitter.

* * * * *